Figure 7:
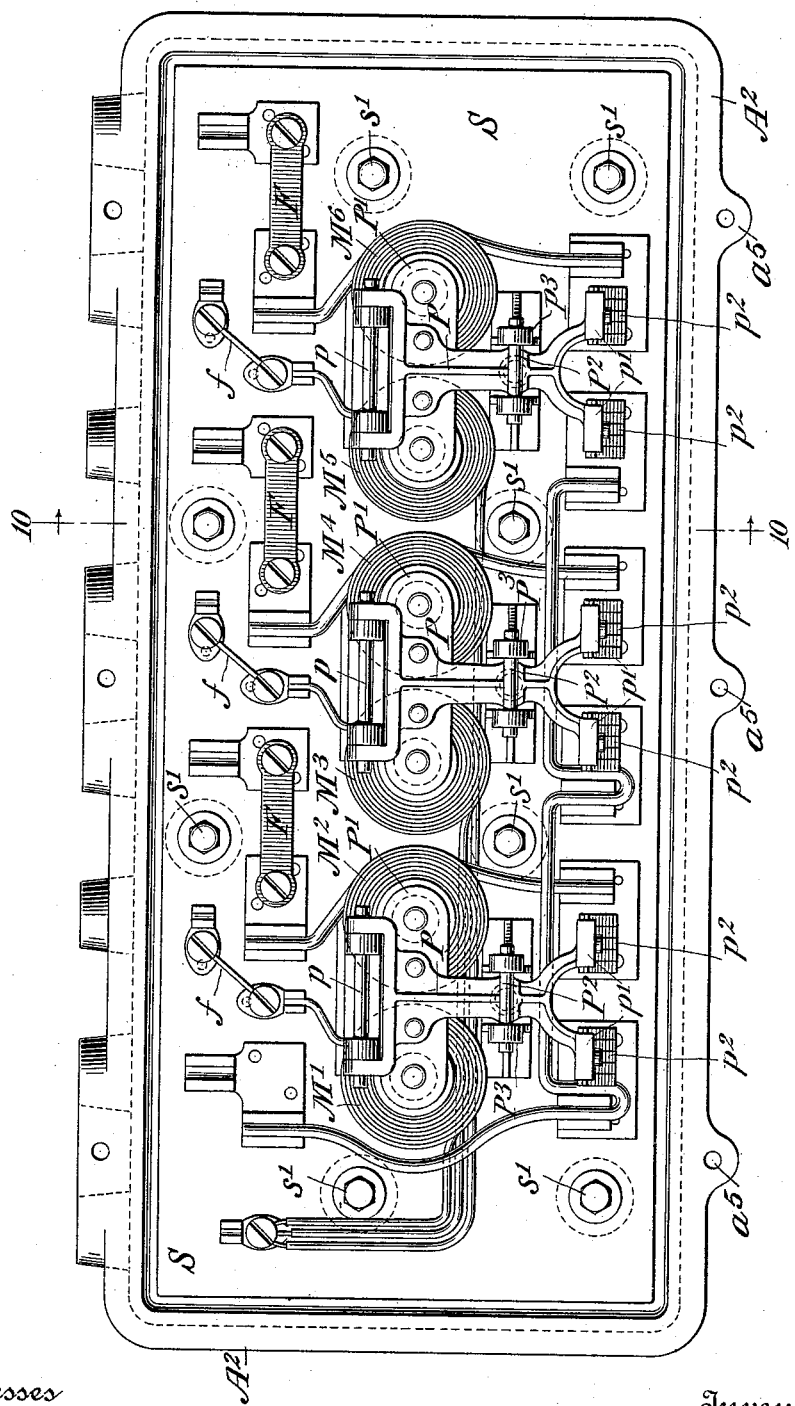

(No Model.) 5 Sheets—Sheet 1.
E. H. JOHNSON & R. LUNDELL.
SUPPLY SYSTEM FOR ELECTRIC RAILWAYS.
No. 523,164. Patented July 17, 1894.
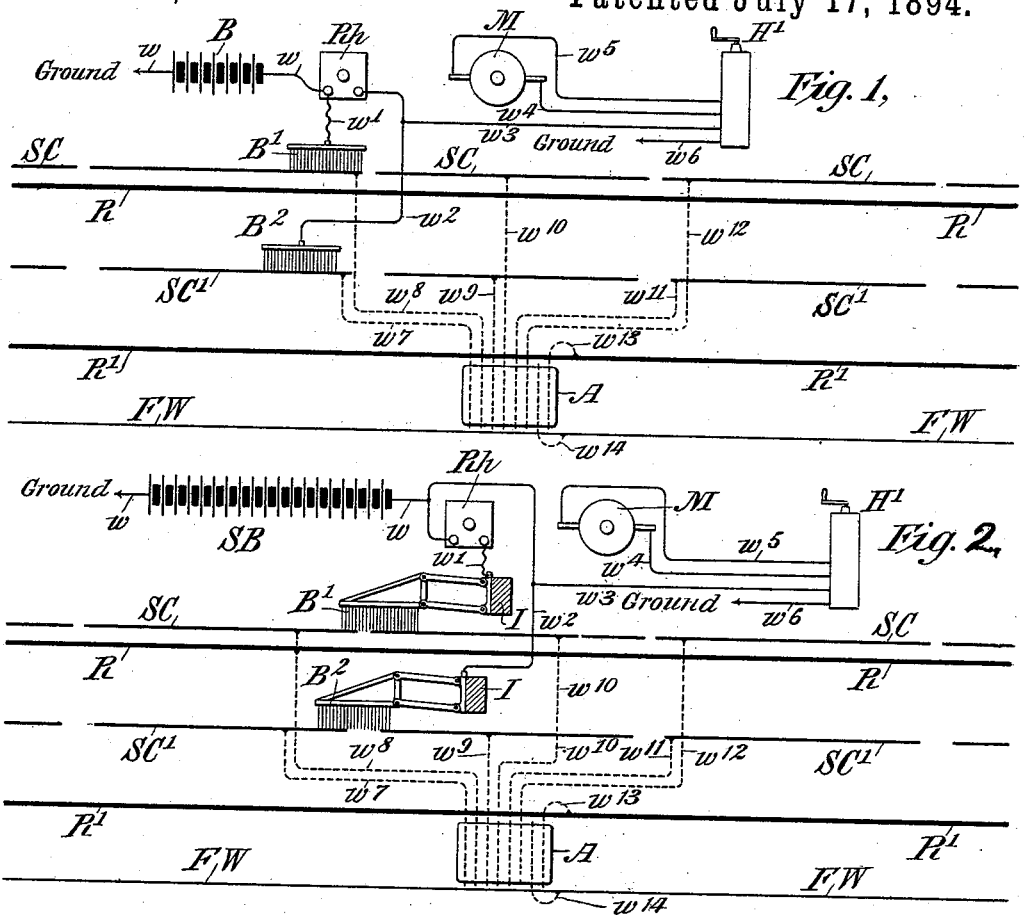
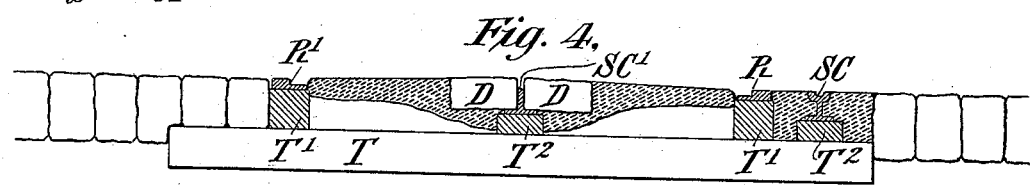
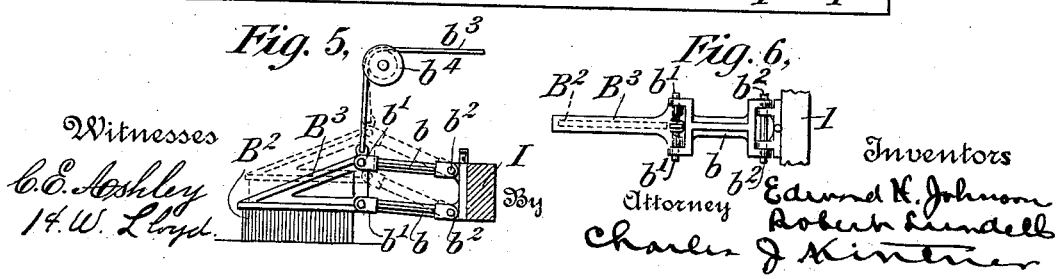
Witnesses
C. E. Ashley
H. W. Lloyd
Inventors
Edward H. Johnson
Robert Lundell
Attorney
Charles J. Kintner (No Model.) 5 Sheets—Sheet 2.

E. H. JOHNSON & R. LUNDELL.
SUPPLY SYSTEM FOR ELECTRIC RAILWAYS.

No. 523,164. Patented July 17, 1894.

Witnesses
C. E. Ashley
H. W. Lloyd

Inventors
Edward H. Johnson
Robert Lundell
By Attorney
Charles J. Kintner (No Model.) 5 Sheets—Sheet 3.
E. H. JOHNSON & R. LUNDELL.
SUPPLY SYSTEM FOR ELECTRIC RAILWAYS.
No. 523,164. Patented July 17, 1894.
Fig. 8,
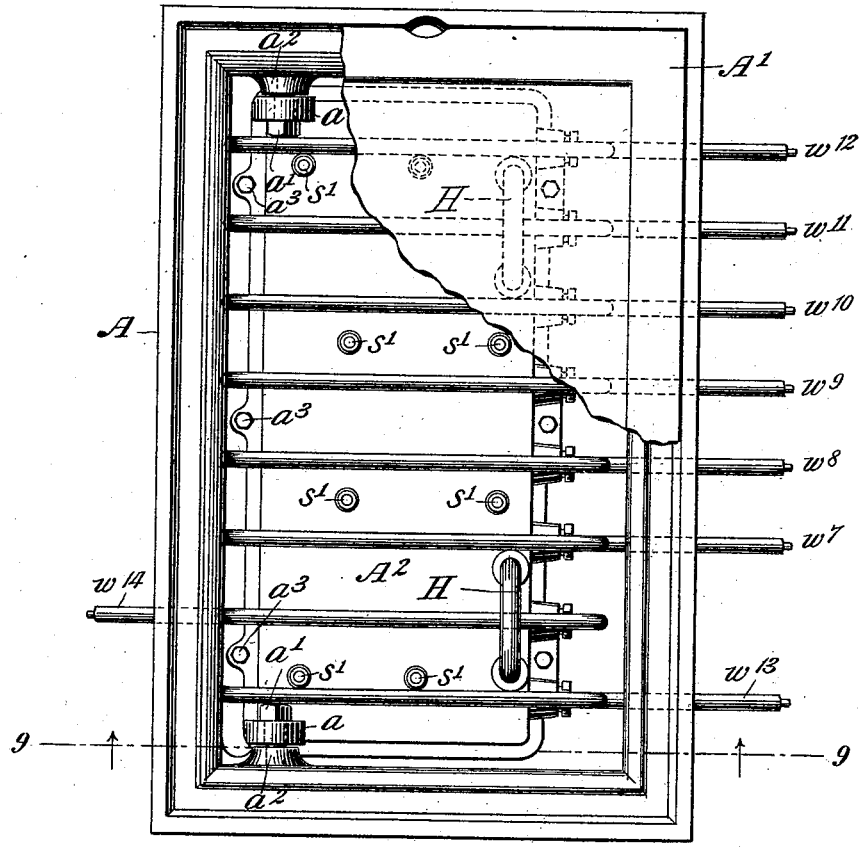
Fig. 9,
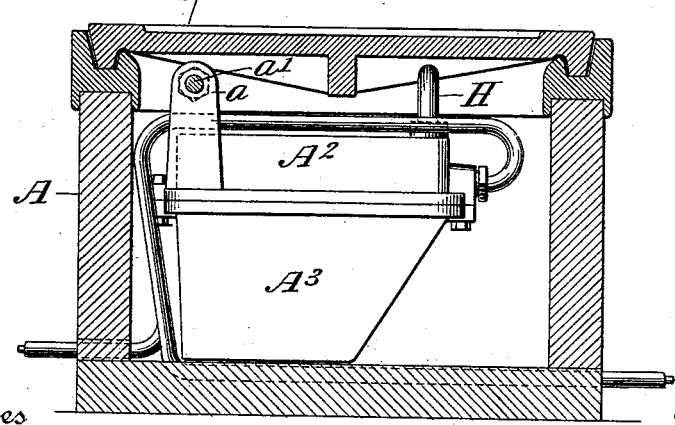
Witnesses
C. E. Ashley
H. W. Lloyd
Inventors
Edward H. Johnson
Robert Lundell
By Attorney Charles J. Kintner
THE NORRIS PETERS CO., PHOTO-LITHO., WASHINGTON, D. C.

(No Model.) 5 Sheets—Sheet 4.
E. H. JOHNSON & R. LUNDELL.
SUPPLY SYSTEM FOR ELECTRIC RAILWAYS.
No. 523,164. Patented July 17, 1894.
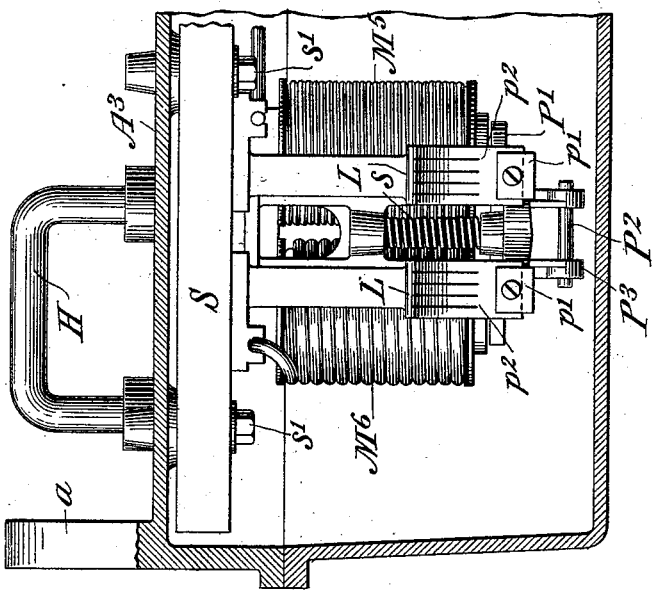
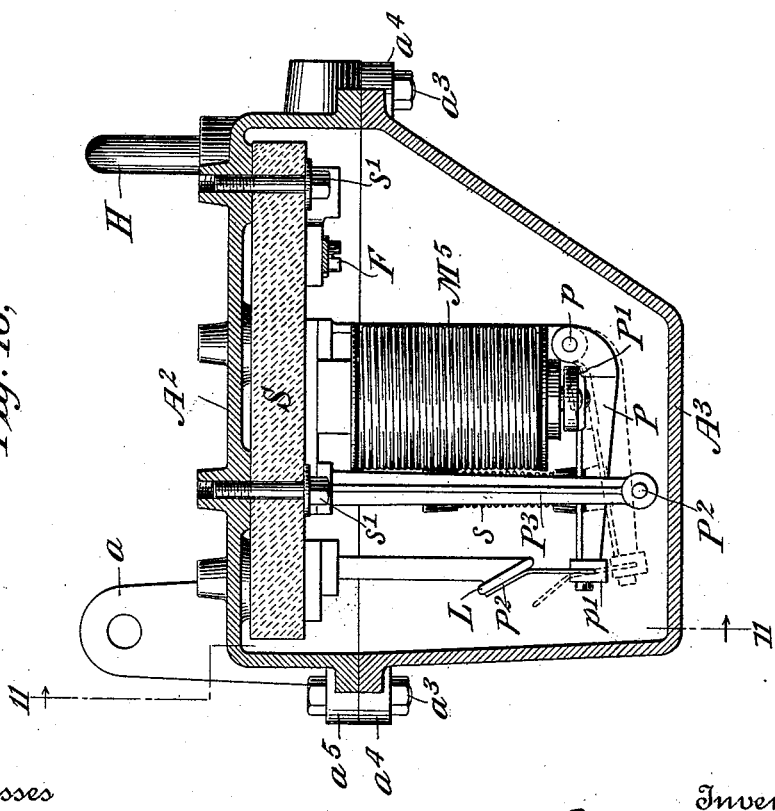
Witnesses
C. E. Ashley
H. W. Lloyd
Inventors
Edward H. Johnson
Robert Lundell
By Attorney
Charles J. Kintner (No Model.) 5 Sheets—Sheet 5.

E. H. JOHNSON & R. LUNDELL.
SUPPLY SYSTEM FOR ELECTRIC RAILWAYS.

No. 523,164. Patented July 17, 1894.

Witnesses
C. E. Ashley
H. W. Lloyd.

Inventors
Edward H. Johnson
Robert Lundell
By Attorney
Charles J. Kintner

UNITED STATES PATENT OFFICE.

EDWARD H. JOHNSON, OF NEW YORK, AND ROBERT LUNDELL, OF BROOKLYN, ASSIGNORS TO THE JOHNSON SUBTROLLEY COMPANY, OF NEW YORK, N. Y.

SUPPLY SYSTEM FOR ELECTRIC RAILWAYS.

SPECIFICATION forming part of Letters Patent No. 523,164, dated July 17, 1894.

Application filed December 19, 1893. Serial No. 494,092. (No model.)

*To all whom it may concern:*

Be it known that we, EDWARD H. JOHNSON, residing at New York, in the county of New York, and ROBERT LUNDELL, residing at Brooklyn, in the county of Kings, State of New York, both citizens of the United States, have made a new and useful Improvement in Electric Railways, of which the following is a specification.

Our invention relates to improvements in that type of electric railways in which the current main or feeder supplying the propelling current is buried or insulated throughout the length of the entire route and is provided with sectional trolley conductors or rails located parallel thereto, each of said sectional conductors having means for automatically connecting it to the current main and disconnecting it therefrom as a car or vehicle passes over them, said car or vehicle being usually provided with one or more contacting brushes or trolleys which convey the current to and through the propelling motor located thereon, and to this end it is directed especially to improvements upon an invention disclosed in a prior application filed in the United States Patent Office by Edward H. Johnson on the 9th day of September, 1893, and bearing Serial No. 485,157.

In the aforesaid application the sectional trolley conductors are located preferably in pairs between the tram-way rails and flush with the surface of the road-bed; switch boxes in sets of three being situated beneath the road-way and connected to said pairs of sectional trolley conductors through switching mechanism in sets of three. With the arrangement of circuits and circuit connections between the current main, switching devices and the sectional trolley conductors as disclosed in said application, there is a bare possibility of current leakage occurring to such an extent during extremely wet weather as to operate any one of such switching magnets as is in circuit connection with the unduly exposed sectional trolley conductor connected thereto.

Our invention therefore has for its objects, first to prevent any possibility of the accidental operation of the switching electro-magnets under any and all conditions of weather: Second to so locate and arrange the switch boxes that they are exterior to the road-bed, easy of access, and that their interior mechanism may be examined without disconnecting any of the operative parts of the apparatus and this even while the cars or vehicles are running regularly. Third to so arrange or locate the sectional trolley conductors that no damage could occur to a person or animal in the event of any one of said conductors having been left in a charged or live condition: Fourth to so simplify the arrangement or construction and attachment of the conducting contact brushes or trolleys that they may be especially efficient and little liable to require repairs: Fifth to provide means whereby it will be utterly impossible for the sectional trolley conductors either in advance or the rear of a traveling car or vehicle to receive any leaking current or be left in any way charged or alive to the danger of passing persons or animals: Sixth to effect any and all of the results necessarily attributable to the entire structure hereinafter described, the essentially novel features of our invention being particularly pointed out in the claims at the end of this specification.

Figure 12:
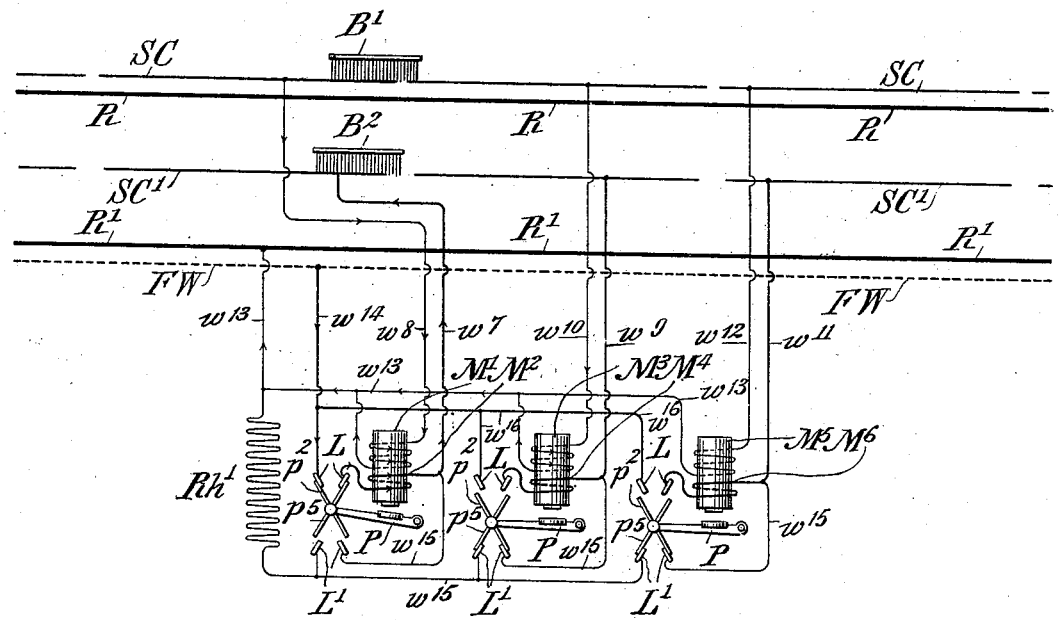
Figure 13:
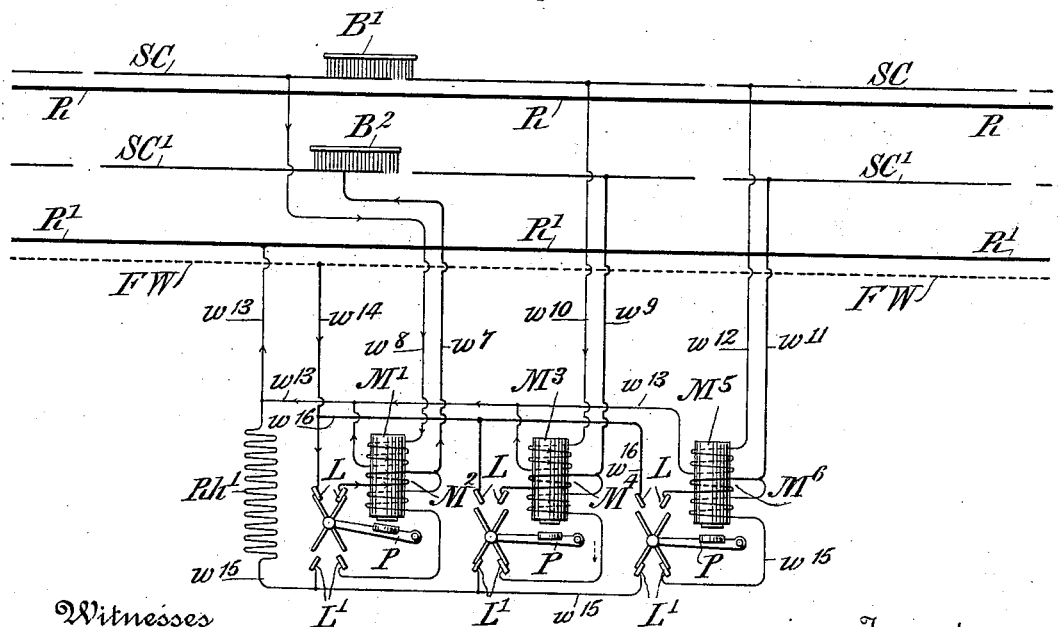

Referring now to the drawings in all of which like letters of reference represent like parts wherever used, Figure 1 is a diagrammatic view of one form of our improved system, illustrating in diagram also an electric motor and circuit connections therefor with the system. Fig. 2 is a similar view of the system illustrating also a storage battery and circuit connections to the propelling motor for driving the propelled vehicle over crossings and our improved form of conducting contact brushes or trolleys as connected thereto. Fig. 3 is a cross sectional view taken through the road-bed of a tram-way, illustrating in cross sectional view the current main with one of our improved switch boxes, together with the circuit connections from the current main to the switch box and sectional trolley rails and tram rails, all of said rails being shown in section and the circuit connections and switch box in dotted lines. Fig. 4 is a cross section of the road-bed of a tramway illustrating our improved manner of protecting the sectional trolley conductors so that when charged they will not be harmful to persons or animals. Figs. 5 and 6 are respectively, detail side elevational and plan views of one of our improved conducting contact brushes or trolleys, together with the operative parts for controlling the movements thereof. Fig. 7 is an enlarged plan view of the interior of one set of switching devices arranged in groups of three in an inclosing box in the same manner as in the prior application of Johnson above referred to, the lid of the switch box in this instance being removed. Fig. 8 is a plan view of a complete inclosed switch box like that shown in Fig. 7, illustrating also the circuit connections running thereto and the manner of suspending the switch box in a surrounding casing provided with an inclosing cover which is shown as partly broken away. Fig. 9 is a cross sectional view taken through Fig. 8 on the line 9—9 and as seen looking in the direction of the arrows from the bottom toward the top of the drawings. Fig. 10 is a cross sectional view taken through Fig. 7 on the line 10—10 and as seen looking in the direction of the arrows upon that figure from the bottom toward the top of the drawings. Fig. 11 is a sectional view taken through Fig. 10 on the broken line 11—11 and as seen looking in the direction of the arrows upon that figure from the bottom toward the top of the drawings. Fig. 12 is a diagrammatic view illustrating our novel arrangement of circuits and circuit controlling devices for preventing any possibility of leakage of current between working or live sectional trolley conductors immediately under the car and those adjacent thereto in front or in the rear of the car. Fig. 13 is a similar diagrammatic view to that shown in Fig. 12 with additional safety circuits attached to the operating electro-magnets for insuring the positive operation of the armatures thereof from either of the conducting or contact brushes.

Referring now to the drawings in detail: R and R′ represent the tram-way rails of usual form resting either upon cross ties T as shown in Fig. 3 or upon longitudinal stringers T′ T′ which are supported in turn by the cross ties, and S C and S C′ represent pairs of sectional trolley conductors, preferably about six feet in length, and separated from each other by proper spaces, said conductors being preferably of T-form grooved in their upper sides and supported upon longitudinal stringers $T^2$ $T^2$ carried by the cross ties T, the surface of the road which embraces the tram rails and sectional trolley conductors being preferably of asphalt, as clearly shown in Figs. 3 and 4.

F W represent the feed wire, preferably a lead covered cable, located in close proximity to the road-bed and provided with branch conductors $w^{14}$ $w^{14}$ running into the switch boxes $A^2$ which are preferably of iron and include each three sets of switching electromagnets M′ $M^2$, $M^3$ $M^4$, and $M^5$ $M^6$ secured in pairs to a slate or other insulating base S which in turn is bolted to the inner face of the switch box by bolts s′ s′ as clearly shown in Figs. 8, 10 and 11.

The switch boxes $A^2$ are pivotally secured by ears a upon bolts or trunnions a′, $a^2$ attached to the inner surfaces of metallic frames which rest in turn upon the tops of wooden protecting boxes A A, the metallic frames being grooved in their upper surfaces so as to admit of the reception of heavy iron lids A′ A′, which when the boxes are in position rest flush with the street surface. The pivoted switch boxes $A^2$ are provided with separable protecting covers $A^3$ which covers are secured in place by bolts extending through lugs or ears $a^4$ $a^5$ as clearly shown in Figs. 8 and 10.

One of the coils of each of the electro-magnets M′ $M^2$, $M^3$ $M^4$, and $M^5$ $M^6$ is of high resistance or many convolutions and the other coil, in each instance, is of low resistance or few convolutions and the circuit connections to and through these several coils from the conductors $w^7$, $w^8$, $w^9$, $w^{10}$, $w^{11}$, $w^{12}$, $w^{13}$ and $w^{14}$ to the sectional trolley conductors S C, S C′ and the tram rails R′ and feed wire F W are not substantially different from the arrangement shown and disclosed in the prior application of Johnson above referred to; the circuit relations generally being such that one coil of each magnet acts as a shunt to draw up the armature P′ and its lever P pivoted at p so as to bring the contact springs $p^2$ $p^2$ into circuit relation with the conducting standards L L and create a new or low resistance path for the working circuit, as will be described more particularly in connection with the description of the mode of operation.

The several insulated branch conductors $w^7$ to $w^{13}$ inclusive enter the boxes A and pass under the switch boxes $A^2$ $A^3$ and over the tops thereof, ultimately entering said switch boxes through proper water tight gaskets on the upper front edges thereof, the arrangement being such that when the covers A′ are removed and the switch boxes tilted upward through the agency of operating handles H H, the incoming conductors will not be sensibly disturbed. In each of the switch boxes and adjacent to each of the pairs of magnets are fuses F F F and f f f of sufficient current carrying capacity to meet the necessities of the case.

B′ $B^2$ are conducting contact brushes or trolleys made preferably of wire or other yielding conducting material secured in each instance to a solid metal back, said brushes being of sufficient width and length to fit in the grooved portions of the sectional trolley conductors S C, S C′ and span or bridge the spaces between succeeding pairs of such conductors. They are each secured to a triangular shaped support $B^3$ in any preferred manner. The triangular shaped support $B^3$ is pivoted to a pair of links or arms $b\ b$ by pins $b'\ b'$, which links in turn are pivotally secured by pins $b^2\ b^2$ to a rigid support, cross bar or arm I located beneath the body of the car and at a point either in the advance of the rear of the brush, thereby adapting this form of sliding brush for operation when the car runs in either direction.

To the upper end of the support $B^3$ is secured a cord or chain $b^3$ which passes over a grooved pulley $b^4$ to the platform of the car where it is accessible to the motor-man either through the agency of a crank and pulley or any preferred operating mechanism, the arrangement being such that the support $B^3$ and its sustained brush $B'\ B^2$ may always be lifted and the brush remain with its lower edge parallel to its position of support when resting in the groove of the sectional trolley conductor, as clearly shown in full and dotted lines respectively in Fig. 5. This manner of supporting the brush also prevents it from jumping and enables all parts of it to be constantly in contact with the sectional conductors as it moves along.

M represents an electric motor and $H'$ the operating switch therefor, said switch being of any preferred form and connected thereto by conductors $w^4\ w^5$ and through an additional conductor $w^6$ to the metallic frame of the car and ultimately to the tram rails R through the wheels thereof, said motor being connected in turn by branch conductors $w^3\ w^2$ running to the conducting contact brush or trolley $B^2$, preferably such as already described and illustrated in Figs. 5 and 6.

might be incurred in the building of the system to accommodate the condition of affairs at such points.

In the system described and claimed in the application of Johnson above referred to, the sectional trolley conductors were all located in pairs between the tram rails R R'. A very essential feature of our invention consists in locating one set of these sectional trolley conductors S C S C outside of one line of the tram rails R, the other set of such sectional trolley conductors S C' being located between the lines of tram rails R and R', which tram rails, it will be understood, are connected together electrically and to the usual return conductors G G in such manner as to constitute a return or leak circuit extending over the entire route, see Fig. 3. By thus arranging one set of sectional trolley conductors outside of the tram rails we afford to the working current a path of much lower resistance from the other set of such sectional trolley conductors thereby preventing any possibility of a leakage from the inner set of sectional trolley conductors to the outer set, which latter set it will be understood is operatively connected through working conductors $w^8$, $w^{10}$ and $w^{12}$ with the switch controlling magnets in the switch boxes $A^2 A^2$. This feature will be more fully explained in connection with the description of the mode of operation later on.

In Fig. 4 we have illustrated our improved manner of protecting the working sectional conductors which convey the current to the propelling motor by locating the said conductors slightly below the level of the road-bed and protecting them on either side by

of sectional trolley conductors S C just before the brush B² bridges the corresponding space between the corresponding adjacent pair of working sectional trolley conductors S C'. This is for the purpose of causing the next switching magnet in advance to rupture the high resistance shunt $w^{15}$ to the corresponding working sectional trolley conductor S C' before the working current is closed through the conducting or contact brush B² thereby avoiding arcing at the back contacts $p^5$ L'.

In the arrangement shown in Fig. 13 certainty of action of the switching magnets is assured by including the shunt circuits $w^{15}$ in additional coils around the operating electro-magnets so that should the switching magnets fail to operate through collected dirt or from any other imperfection between adjacent sectional trolley conductors S C and the brush B' they will be operated by the working current through the conducting brush B² when it reaches the next sectional trolley conductor in advance. With such an arrangement of circuits therefore the operation of the switching magnets is made doubly sure.

When it is desired to examine any of the switching apparatus the cover A' to that particular set of apparatus is removed from the box A and the switch box A² A³ turned outward from the track through the agency of the handles H H about the pivotal supports $a^2$ $a'$ so that the switch box A² A³ is wholly exposed, the incoming conductors $w^7$ to $w^{13}$ inclusive not being disturbed. The separable part A³ of the box is then detached by removing the screw bolts $a^3$ $a^3$ and the entire operation of the switching magnets is made visible to an attendant even during the time that the cars are running, thus making it possible to detect any defect in the apparatus without delaying traffic. This feature is deemed by us also as of especial importance.

We do not limit ourselves to the special details of construction herein shown and described.

We believe it is broadly new with us to prevent current leakage between active or live sections of trolley conductors beneath the car and the adjacent sections of such trolley conductors not for the time being connected to the working circuit, and our claims in this particular are also of the most generic scope. We believe also that we are the first to locate switch boxes wholly inclosing electro-magnetic switching mechanism outside of the lines of the tram rails and to so arrange said switch boxes that they may be opened and examined while the propelled cars or vehicles are in motion without disturbing the circuit connections or delaying traffic upon the road, and our claims in this particular are also generic.

Having thus described our invention, what we claim, and desire to secure by Letters Patent of the United States, is—

1. In an electric railway system a current feeder or main insulated throughout its length; a series of sectional trolley conductors having circuit connections and electro-magnetic switching devices adapted to connect said sectional trolley conductors to the current feeder or main in sequence; a second set of sectional trolley conductors having circuit connections with the electro-magnets of said switching devices, in combination with a leak circuit located between the two sets of sectional trolley conductors whereby a leak from the working circuit can never accidentally operate the switching magnets.

2. In an electric railway system a current feeder or main insulated throughout its length, a series of sectional trolley conductors adjacent thereto and provided with circuit connections and means for connecting them in sequence to the current feeder or main; a second set of sectional trolley conductors having circuit connections with electro-magnetic switching devices for connecting the first set of sectional conductors to the feeder or main, in combination with an electrical generator having one pole connected to the current feeder or main and the other to a return conductor located throughout its length between the two sets of sectional trolley conductors.

3. In an electric railway system a current feeder or main insulated throughout its length; working sectional trolley conductors provided with electro-magnetic means for connecting them to the current feeder or main in sequence; a second set of sectional trolley conductors provided with circuit connections to said electro-magnetic means, in combination with a leak circuit between the two sets of trolley conductors.

4. An electric railway system having an insulated current feeder or main, a series of exposed working sectional trolley conductors located between tram rails which are electrically connected together and to earth and a series of exposed switch actuating trolley conductors located outside of the tram rails, in combination with switch actuating devices for connecting the working sectional trolley conductors to the current feeder or main, said devices being electrically connected with the outer line of sectional trolley conductors.

5. An electric railway system provided with a current feeder or main insulated throughout its length and a series of sectional trolley conductors, in combination with electro-magnetic switching devices and circuit connections for automatically connecting said sectional trolley conductors to the current feeder or main in sequence, said switching devices being inclosed in removable switch boxes located preferably outside of the lines of tram rails, the arrangement being such that the switch boxes may be opened and their interior mechanism examined while the propelled cars or vehicles are in motion.

6. An electric railway system provided with a current feeder or main insulated throughout its length; exposed sectional trolley connections and switch box in dotted lines. Fig. 4 is a cross section of the road-bed of a tramway illustrating our improved manner of protecting the sectional trolley conductors so that when charged they will not be harmful to persons or animals. Figs. 5 and 6 are respectively, detail side elevational and plan views of one of our improved conducting contact brushes or trolleys, together with the operative parts for controlling the movements thereof. Fig. 7 is an enlarged plan view of the interior of one set of switching devices arranged in groups of three in an inclosing box in the same manner as in the prior application of Johnson above referred to, the lid of the switch box in this instance being removed. Fig. 8 is a plan view of a complete inclosed switch box like that shown in Fig. 7, illustrating also the circuit connections running thereto and the manner of suspending the switch box in a surrounding casing provided with an inclosing cover which is shown as partly broken away. Fig. 9 is a cross sectional view taken through Fig. 8 on the line 9—9 and as seen looking in the direction of the arrows from the bottom toward the top of the drawings. Fig. 10 is a cross sectional view taken through Fig. 7 on the line 10—10 and as seen looking in the direction of the arrows upon that figure from the bottom toward the top of the drawings. Fig. 11 is a sectional view taken through Fig. 10 on the broken line 11—11 and as seen looking in the direction of the arrows upon that figure from the bottom toward the top of the drawings. Fig. 12 is a diagrammatic view illustrating our novel arrangement of circuits and circuit controlling devices for preventing any possibility of leakage of current between working or live sectional trolley conductors immediately under the car and those adjacent thereto in front or in the rear of the car. Fig. 13 is a similar diagrammatic view to that shown in Fig. 12 with additional safety circuits attached to the operating electro-magnets for insuring the positive operation of the armatures thereof from either of the conducting or contact brushes.

Referring now to the drawings in detail: R and R′ represent the tram-way rails of usual form resting either upon cross ties T as shown in Fig. 3 or upon longitudinal stringers T′ T′ which are supported in turn by the cross ties, and S C and S C′ represent pairs of sectional trolley conductors, preferably about six feet in length, and separated from each other by proper spaces, said conductors being preferably of T-form grooved in their upper sides and supported upon longitudinal stringers $T^2$ $T^2$ carried by the cross ties T, the surface of the road which embraces the tram rails and sectional trolley conductors being preferably of asphalt, as clearly shown in Figs. 3 and 4.

F W represent the feed wire, preferably a lead covered cable, located in close proximity to the road-bed and provided with branch conductors $w^{14}$ $w^{14}$ running into the switch boxes $A^2$ which are preferably of iron and include each three sets of switching electro-magnets M′ $M^2$, $M^3$ $M^4$, and $M^5$ $M^6$ secured in pairs to a slate or other insulating base S which in turn is bolted to the inner face of the switch box by bolts s′ s′ as clearly shown in Figs. 8, 10 and 11.

The switch boxes $A^2$ are pivotally secured by ears a upon bolts or trunnions a′, $a^2$ attached to the inner surfaces of metallic frames which rest in turn upon the tops of wooden protecting boxes A A, the metallic frames being grooved in their upper surfaces so as to admit of the reception of heavy iron lids A′ A′, which when the boxes are in position rest flush with the street surface. The pivoted switch boxes $A^2$ are provided with separable protecting covers $A^3$ which covers are secured in place by bolts extending through lugs or ears $a^4$ $a^5$ as clearly shown in Figs. 8 and 10.

One of the coils of each of the electro-magnets M′ $M^2$, $M^3$ $M^4$, and $M^5$ $M^6$ is of high resistance or many convolutions and the other coil, in each instance, is of low resistance or few convolutions and the circuit connections to and through these several coils from the conductors $w^7$, $w^8$, $w^9$, $w^{10}$, $w^{11}$, $w^{12}$, $w^{13}$ and $w^{14}$ to the sectional trolley conductors S C, S C′ and the tram rails R′ and feed wire F W are not substantially different from the arrangement shown and disclosed in the prior application of Johnson above referred to; the circuit relations generally being such that one coil of each magnet acts as a shunt to draw up the armature P′ and its lever P pivoted at p so as to bring the contact springs $p^2$ $p^2$ into circuit relation with the conducting standards L L and create a new or low resistance path for the working circuit, as will be described more particularly in connection with the description of the mode of operation.

The several insulated branch conductors $w^7$ to $w^{13}$ inclusive enter the boxes A and pass under the switch boxes $A^2$ $A^3$ and over the tops thereof, ultimately entering said switch boxes through proper water tight gaskets on the upper front edges thereof, the arrangement being such that when the covers A′ are removed and the switch boxes tilted upward through the agency of operating handles H H, the incoming conductors will not be sensibly disturbed. In each of the switch boxes and adjacent to each of the pairs of magnets are fuses F F F and f f f of sufficient current carrying capacity to meet the necessities of the case.

B′ $B^2$ are conducting contact brushes or trolleys made preferably of wire or other yielding conducting material secured in each instance to a solid metal back, said brushes being of sufficient width and length to fit in the grooved portions of the sectional trolley conductors S C, S C′ and span or bridge the spaces between succeeding pairs of such conductors. They are each secured to a triangular shaped support $B^3$ in any preferred manner. The